US012755461B2

(12) United States Patent
Yuan et al.

(10) Patent No.: US 12,755,461 B2
(45) Date of Patent: Oct. 6, 2026

(54) SYSTEMS AND METHODS FOR IMAGE RECONSTRUCTION

(71) Applicant: SHANGHAI UNITED IMAGING HEALTHCARE CO., LTD., Shanghai (CN)

(72) Inventors: Zhou Yuan, Shanghai (CN); Yan'ge Ma, Shanghai (CN); Jian Zhong, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 370 days.

(21) Appl. No.: 18/516,890

(22) Filed: Nov. 21, 2023

(65) Prior Publication Data

US 2024/0087186 A1 Mar. 14, 2024

Related U.S. Application Data

(63) Continuation of application No. PCT/CN2022/096238, filed on May 31, 2022.

(30) Foreign Application Priority Data

Jun. 1, 2021 (CN) ......................... 202110610746.4

(51) Int. Cl.

*G06T 12/10* (2026.01)
*G06T 7/10* (2017.01)
*G06V 10/75* (2022.01)

(52) U.S. Cl.

CPC ................ *G06T 12/10* (2026.01); *G06T 7/10* (2017.01); *G06V 10/751* (2022.01); *G06T 2207/10081* (2013.01)

(58) Field of Classification Search

CPC . G06T 12/10; G06T 7/10; G06T 2207/10081; G06T 2211/432; G06T 5/94;

(Continued)

(56) References Cited

U.S. PATENT DOCUMENTS

| | | | | |
|---|---|---|---|---|
| 2004/0066911 A1* | 4/2004 | Hsieh | ...................... | G06T 12/10 378/4 |
| 2008/0123806 A1* | 5/2008 | Scholz | ................. | G03B 42/026 378/18 |

(Continued)

FOREIGN PATENT DOCUMENTS

| | | |
|---|---|---|
| CN | 1671187 A | 9/2005 |
| CN | 103699543 A | 4/2014 |

(Continued)

OTHER PUBLICATIONS

The Extended European Search Report in European Application No. 22815268.2 mailed on Sep. 19, 2024, 7 pages.

(Continued)

*Primary Examiner* — Oneal R Mistry
*Assistant Examiner* — Justin Philip Cascais
(74) *Attorney, Agent, or Firm* — METIS IP LLC

(57) ABSTRACT

The present disclosure relates to a system and a method for image reconstruction. The method may include obtaining a projection image of a subject acquired by an imaging device, the projection image including a first region with a normal exposure corresponding to a first portion of the subject and a second region with an overexposure corresponding to a second portion of the subject; using first pixel values of first pixels in the first region to correct second pixel values of second pixels in the second region; and reconstructing, based on the first pixel values of the first pixels in the first region and the corrected second pixel values of the second pixels in the second region, a target image of the subject.

20 Claims, 6 Drawing Sheets

(58) Field of Classification Search
CPC ... G06T 7/11; G06T 7/13; G06T 2207/10101; G06T 12/30; G06V 10/751
See application file for complete search history.

(56) References Cited

U.S. PATENT DOCUMENTS

| | | | |
|---|---|---|---|
| 2010/0254585 A1 | 10/2010 | Brunner et al. | |
| 2011/0317894 A1* | 12/2011 | Yang | G06T 11/005 382/131 |
| 2014/0119628 A1 | 5/2014 | Elad et al. | |
| 2014/0126784 A1 | 5/2014 | Hsieh et al. | |
| 2015/0187633 A1 | 7/2015 | Wang et al. | |
| 2017/0061592 A1 | 3/2017 | Reinhard et al. | |
| 2017/0301114 A1 | 10/2017 | Yang et al. | |
| 2019/0164317 A1* | 5/2019 | Tang | A61B 6/032 |
| 2023/0068259 A1 | 3/2023 | Cui et al. | |

FOREIGN PATENT DOCUMENTS

| | | |
|---|---|---|
| CN | 109998578 A | 7/2019 |
| CN | 110473269 A | 11/2019 |
| CN | 111311509 A | 6/2020 |
| EP | 3667620 A1 | 6/2020 |
| WO | 2022253223 A1 | 12/2022 |

OTHER PUBLICATIONS

Jared Starman et al., Estimating 0th and 1st moments in C-arm CT data for extrapolating truncated projections, Medical Imaging, 5747: 378-387, 2005.

International Search Report in PCT/CN2022/096238 mailed on Aug. 30, 2022, 5 pages.

Written Opinion in PCT/CN2022/096238 mailed on Aug. 30, 2022, 7 pages.

Xu, Yan et al., Projective Image Correction of Cone Beam CT with Flat Panel Detector, Computer Engineering and Applications, 52(4): 163-167, 2016.

Hu, Renfang et al., Detector Correction Method Retaining Source Grating in Grating based X-ray Phase-contrast Imaging, Atomic Energy Science and Technology, 52(1): 150-155, 2018.

Qi, Hongliang, Research of Iterative CT Image Reconstruction Using Limited Projection Data, Doctoral Dissertation, 132 pages.

Zhang, Xiao-ping et al., Study on reducing radiation dose in digital radiography of infant chest, China Medical Equipment, 10(7): 84-87, 2013.

Francesca Leek et al., Air Fraction Correction Optimisation in PET Imaging of Lung Disease, IEEE, 2020, 4 pages.

* cited by examiner

500

SYSTEMS AND METHODS FOR IMAGE RECONSTRUCTION

CROSS-REFERENCE TO RELATED APPLICATIONS

This application is a continuation of International Patent Application No. PCT/CN2022/096238, filed on May 31, 2022, which claims the priority of Chinese Patent Application No. 202110610746.4, filed on Jun. 1, 2021, the contents of each of which are hereby incorporated by reference.

TECHNICAL FIELD

The disclosure generally relates to image processing, and more particularly relates to systems and methods for image reconstruction.

BACKGROUND

X-rays have been widely used in medical diagnosis, radiotherapy planning, surgery planning, radiotherapy, and other medical procedures. Generally, an X-ray image (e.g., a cone beam computed tomography (CBCT) image) can be generated based on imaging data acquired by a detector that is configured to detect the radiation beams through a subject (e.g., a patient) within a detection region of the detector. However, in some imaging data acquisition processes, since there are differences in various portions of the subject (e.g., a thickness difference between the central portion and the edge portion of the subject) and the radiation dose may be relatively high, there can be uneven exposures that result in artifacts in the image, e.g., radiation beams through a certain portion (e.g., the edge portion) of the subject may exceed a detection range of the detector, leading to partial overexposure of the reconstructed image of the subject generated directly using the acquired imaging data, thus affecting overall image quality. Therefore, it is desirable to provide systems and methods for image reconstruction to eliminate or reduce image artifacts associated with uneven exposure, especially overexposure, thereby improving image quality.

SUMMARY

According to an aspect of the present disclosure, a system is provided. The system may include at least one storage device including a set of instructions for image correction; and at least one processor in communication with the at least one storage device. When executing the set of instructions, the at least one processor is configured to cause the system to perform operations. The operations may include obtaining a projection image of a subject acquired by an imaging device, the projection image including a first region with a normal exposure corresponding to a first portion of the subject and a second region with an overexposure corresponding to a second portion of the subject; using first pixel values of first pixels in the first region to correct second pixel values of second pixels in the second region; and reconstructing, based on the first pixel values of the first pixels in the first region and the corrected second pixel values of the second pixels in the second region, a target image of the subject.

In some embodiments, the obtaining a projection image of a subject may include obtaining a raw projection image of the subject acquired by the imaging device; segmenting the raw projection image according to a maximum pixel value among pixel values of pixels of the raw projection image; and determining the projection image based on the segmented raw projection image.

In some embodiments, the operations may further include performing an air correction operation on the projection image or the raw projection image.

In some embodiments, wherein the using first pixel values of first pixels in the first region to correct second pixel values of second pixels in the second region may include correcting, using the first pixel values of the first pixels in the first region, the second pixel values of the second pixels in the second region one by one starting from a second pixel adjacent to the first region.

In some embodiments, the correcting, using the first pixel values of the first pixels in the first region, at least one of the second pixel values of the second pixels in the second region one by one starting from a second pixel adjacent to the first region may include for a current second pixel to be corrected, determining a value reference pixel corresponding to the current second pixel, the value reference pixel being a first pixel in the first region or a corrected second pixel in the second region; determining a gradient reference pixel in the first region corresponding to the current second pixel; determining a local pixel gradient value of the gradient reference pixel; and determining, based on a reference pixel value of the value reference pixel and the local pixel gradient value of the gradient reference pixel, the corrected second pixel value of the current second pixel.

In some embodiments, the determining a value reference pixel corresponding to the current second pixel may include designating a corrected second pixel located in a same row as the current second pixel and adjacent to the current second pixel as the value reference pixel corresponding to the current second pixel.

In some embodiments, the determining a gradient reference pixel in the first region may include designating a first pixel in the first region that is located in a same row as the current second pixel and adjacent to the second region as a critical pixel; and determining a first pixel located in the same row as the current second pixel and symmetrical with the current second pixel with respect to the critical pixel as the gradient reference pixel.

In some embodiments, the determining a local pixel gradient value of the gradient reference pixel may include determining, based on the gradient reference pixel, two gradient estimation pixels; and determining, based on pixel values of the two gradient estimation pixels and a count of pixels spacing the two gradient estimation pixels, the local pixel gradient value of the gradient reference pixel.

In some embodiments, the determining, based on the gradient reference pixel, two gradient estimation pixels may include designating the gradient reference pixel as one of the two gradient estimation pixels; and designating a first pixel located in a same row as the gradient reference pixel and separated by a first count of pixels as another gradient estimation pixel.

In some embodiments, the determining, based on the gradient reference pixel, two gradient estimation pixels may include designating a first pixel located in a same row as the gradient reference pixel and separated by a second count of pixels as one of the two gradient estimation pixels; and designating a first pixel located in the same row as the gradient reference pixel and separated by a third count of pixels as another gradient estimation pixel, the gradient reference pixel being between the two gradient estimation pixels.

In some embodiments, the determining, based on pixel values of the two gradient estimation pixels and a count of pixels spacing the two gradient estimation pixels, the local pixel gradient value of the gradient reference pixel may include determining a difference between the pixel values of the two gradient estimation pixels; and determining the local pixel gradient value of the gradient reference pixel by dividing the difference by the count of pixels spacing the two gradient estimation pixels.

In some embodiments, the determining, based on a reference pixel value of the value reference pixel and the local pixel gradient value of the gradient reference pixel, the corrected second pixel value of the current second pixel may include determining a difference between the reference pixel value of the value reference pixel and the local pixel gradient value of the gradient reference pixel; determining whether a correction termination condition is satisfied; in response to determining that the correction termination condition is satisfied, determining the corrected second pixel value of the current second pixel by performing a post-processing operation on the difference corresponding to the current second pixel.

In some embodiments, the correction termination condition may include that the difference corresponding to the current second pixel is less than or equal to zero. The determining the corrected second pixel value of the current second pixel by performing a post-processing operation on the difference corresponding to the current second pixel may include adjusting the difference corresponding to the current second pixel to zero, and designating the adjusted difference as the corrected second pixel value of the current second pixel.

In some embodiments, the correction termination condition may include that a count of corrected second pixels reaches a threshold count and the difference corresponding to the current second pixel is greater than zero, or the current second pixel is the last pixel in the row where the current second pixel is located and the difference corresponding to the current second pixel is greater than zero. The determining the corrected second pixel value of the current second pixel by performing a post-processing operation on the difference corresponding to the current second pixel may include determining weights for the determined differences of the second pixels; and determining, based on the weights and the determined differences, the corrected second pixel values of the second pixels in the second region.

In some embodiments, the imaging device may include a cone beam computed tomography (CBCT) device.

According to another aspect of the present disclosure, a method for image reconstruction is provided. The method may be implemented on a computing device having at least one processor and at least one storage device. The method may include obtaining a projection image of a subject acquired by an imaging device, the projection image including a first region with a normal exposure corresponding to a first portion of the subject and a second region with an overexposure corresponding to a second portion of the subject; using first pixel values of first pixels in the first region to correct second pixel values of second pixels in the second region; and reconstructing, based on the first pixel values of the first pixels in the first region and the corrected second pixel values of the second pixels in the second region, a target image of the subject.

According to yet an aspect of the present disclosure, a non-transitory computer readable medium is provided. The non-transitory computer readable medium may comprise at least one set of instructions for image reconstruction. When executed by at least one processor of a computing device, the at least one set of instructions may direct the at least one processor to perform operations including obtaining a projection image of a subject acquired by an imaging device, the projection image including a first region with a normal exposure corresponding to a first portion of the subject and a second region with an overexposure corresponding to a second portion of the subject; using first pixel values of first pixels in the first region to correct second pixel values of second pixels in the second region; and reconstructing, based on the first pixel values of the first pixels in the first region and the corrected second pixel values of the second pixels in the second region, a target image of the subject.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein.

DETAILED DESCRIPTION

Figure 1:
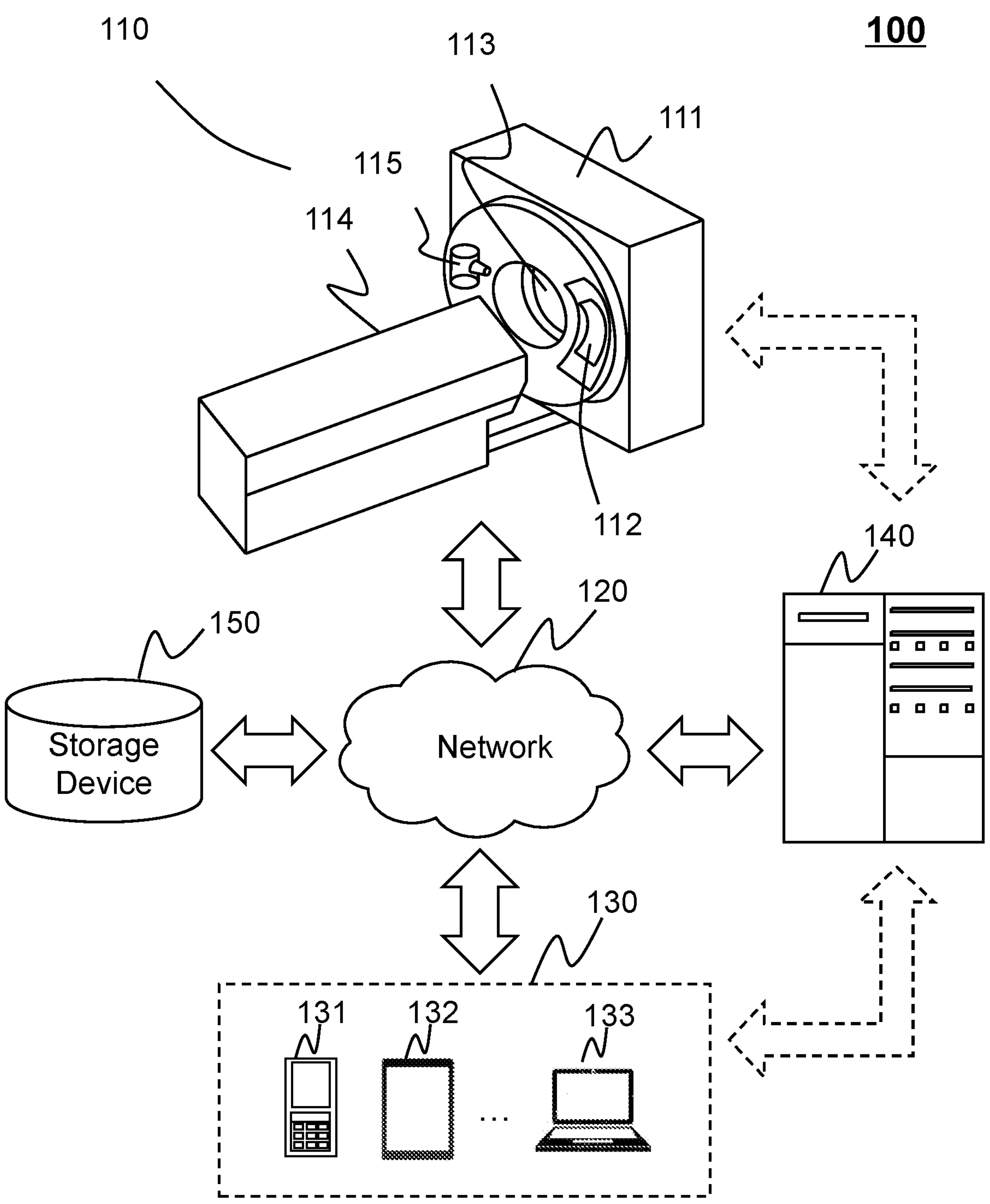
FIG. 1 is a schematic diagram illustrating an exemplary imaging system according to some embodiments of the present disclosure.

The following description is presented to enable any person skilled in the art to make and use the present disclosure and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including" when used in this disclosure, specify the presence of stated features, integers, steps, operations, elements, and/or components, but do not preclude the presence or addition of one or more other features, integers, steps, operations, elements, components, and/or groups thereof.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an erasable programmable read-only memory (EPROM). It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that the term "system," "engine," "unit," "module," and/or "block" used herein are one method to distinguish different components, elements, parts, sections or assembly of different levels in ascending order. However, the terms may be displaced by another expression if they achieve the same purpose.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments in the present disclosure. It is to be expressly understood, the operations of the flowchart may be implemented not in order. Conversely, the operations may be implemented in an inverted order, or simultaneously. Moreover, one or more other operations may be added to the flowcharts. One or more operations may be removed from the flowcharts.

The present disclosure provides mechanisms (which can include methods, systems, a computer-readable medium, etc.) for reconstructing an image of a subject. A method provided in the present disclosure may include obtaining a projection image of a subject acquired by an imaging device. The projection image may include a first region with a normal exposure corresponding to a first portion of the subject and a second region with an overexposure corresponding to a second portion of the subject. The method may further include using first pixel values of first pixels in the first region to correct second pixel values of second pixels in the second region. The method may further include reconstructing, based on the first pixel values of the first pixels in the first region and the corrected second pixel values of the second pixels in the second region, a target image of the subject.

According to some embodiments of the present disclosure, by correcting the second pixel values of the second pixels in the second region using the first pixel values of the first pixels in the first region before image reconstruction and reconstructing the target image using the first pixel values of the first pixels in the first region and the corrected second pixel values of the second pixels in the second region, image artifacts (e.g., truncation artifact) caused by overexposure during image acquisition can be eliminated or reduced. Moreover, in some embodiments, the second region with the overexposure may be corrected according to local pixel gradient values of gradient reference pixel in the first region with the normal exposure, which can improve the accuracy of determining a range (e.g., a truncation length) of the reconstructed image affected by overexposure, thereby improving the robustness of the reconstruction technique disclosed in the present disclosure.

FIG. 1 is a schematic diagram illustrating an exemplary imaging system according to some embodiments of the present disclosure.

As illustrated in FIG. 1, the imaging system 100 may include an imaging device 110, a network 120, a terminal device 130, a processing device 140, and a storage device 150. The components in the imaging system 100 may be connected in one or more of various ways. Merely by way of example, the imaging device 110 may be connected to the processing device 140 through the network 120. As another example, the imaging device 110 may be connected to the processing device 140 directly as indicated by the bi-directional arrow in dotted lines linking the imaging device 110 and the processing device 140. As a further example, the storage device 150 may be connected to the processing device 140 directly or through the network 120. As still a further example, the terminal device 130 may be connected to the processing device 140 directly (as indicated by the bi-directional arrow in dotted lines linking the terminal device 130 and the processing device 140) or through the network 120.

The imaging device 110 may be configured to scan a subject using radiation rays and generate imaging data used to generate one or more images relating to the subject. The imaging data relating to at least one part of the subject may include an image (e.g., an image slice), projection data, or a combination thereof. The subject may be biological or non-biological. Merely by way of example, the subject may include a patient, a man-made object, etc. As another example, the subject may include a specific portion, organ, and/or tissue of the patient. For example, the subject may include the head, the brain, the neck, the body, a shoulder, an arm, the thorax, the heart, the stomach, a blood vessel, a soft tissue, a knee, feet, or the like, or any combination thereof. In some embodiments, the imaging device 110 may include a computed tomography (CT) device (e.g., a cone beam computed tomography (CBCT) device, a fan-beam computed tomography (FBCT) device), a computed tomography-positron emission tomography (CT-PET) device, a computed tomography-magnetic resonance imaging (CT-MRI) device, or the like, or a combination thereof. For illustration purposes, the CBCT device may be taken as an exemplary imaging device 110 in the present disclosure.

In some embodiments, the imaging device 110 may include a gantry 111, one or more detectors 112, a detecting region 113, a table 114, a radiation source 115, or any other components. The gantry 111 may be configured to provide support for other components (e.g., the radiation source 115, the detector(s) 112, etc.) of the imaging device 110. The table 114 may be configured to locate and/or support a subject. A subject may be placed on the table 114 and moved into the detecting region 113 (e.g., a space between the detectors 112 and the radiation source 115) of the imaging device 110. The radiation source 115 may be configured to generate and/or emit radiation rays (e.g., X-rays, γ-rays, α-rays, etc.) to scan the subject that is placed on the table 114. The detector 112 may detect the radiation beams through at least part of the subject within the detection region 113. In some embodiments, the detector(s) 112 and the radiation source 115 may be oppositely mounted on the gantry 111. In some embodiments, the gantry 111 may rotate and/or move. The detector(s) 112 and the radiation source 115 may rotate along with the rotation of the gantry 111.

The network 120 may include any suitable network that can facilitate the exchange of information and/or data for the imaging system 100. In some embodiments, one or more components of the imaging system 100 (e.g., the imaging device 110, the terminal device 130, the processing device 140, the storage device 150) may communicate information and/or data with one or more other components of the imaging system 100 via the network 120. For example, the processing device 140 may obtain image data from the imaging device 110 via the network 120. As another example, the processing device 140 may obtain user instruction(s) from the terminal device 130 via the network 120. In some embodiments, the network 120 may be any type of wired or wireless network, or a combination thereof. The network 120 may be or include a public network (e.g., the Internet), a private network (e.g., a local area network (LAN), a wide area network (WAN)), a wired network (e.g., an Ethernet network), a wireless network (e.g., an 802.11 network, a Wi-Fi network, etc.), a cellular network (e.g., a Long Term Evolution (LTE) network), a frame relay network, a virtual private network (VPN), a satellite network, a telephone network, routers, hubs, switches, server computers, and/or any combination thereof. Merely by way of example, the network 120 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or any combination thereof. In some embodiments, the network 120 may include one or more network access points. For example, the network 120 may include wired and/or wireless network access points such as base stations and/or internet exchange points through which one or more components of the imaging system 100 may be connected to the network 120 to exchange data and/or information.

The terminal device 130 may be connected to and/or communicate with the imaging device 110, the processing device 140, and/or the storage device 150. For example, the terminal device 130 may obtain a processed image from the processing device 140. As another example, the terminal device 130 may enable user interactions with the imaging system 100. In some embodiments, the terminal device 130 may include a mobile device 131, a tablet computer 132, a laptop computer 133, or the like, or any combination thereof. For example, the mobile device 131 may include a mobile phone, a personal digital assistant (PDA), a gaming device, a navigation device, a point of sale (POS) device, a laptop, a tablet computer, a desktop, or the like, or any combination thereof. In some embodiments, the terminal device 130 may include an input device, an output device, etc. The input device may include alphanumeric and other keys that may be input via a keyboard, a touch screen (for example, with haptics or tactile feedback), a speech input, an eye-tracking input, a brain monitoring system, or any other comparable input mechanism. The input information received through the input device may be transmitted to the processing device 140 via, for example, a bus, for further processing. Other types of input device may include a cursor control device, such as a mouse, a trackball, or cursor direction keys, etc. The output device may include a display, a speaker, a printer, or the like, or a combination thereof. In some embodiments, the terminal device 130 may be part of the processing device 140.

The processing device 140 may process data and/or information obtained from the imaging device 110, the terminal device 130, and/or the storage device 150. For example, the processing device 140 may obtain a projection image including a first region with a normal exposure corresponding to a first portion of the subject and a second region with an overexposure corresponding to a second portion of the subject. The processing device 140 may use first pixel values of first pixels in the first region to correct second pixel values of second pixels in the second region. The processing device 140 may reconstruct a target image of the subject based on the first pixel values of the first pixels in the first region and the corrected second pixel values of the second pixels in the second region. As another example, the processing device 140 may perform an air correction operation on the projection image before correcting the projection image. In some embodiments, the processing device 120 may include a central processing unit (CPU), a digital signal processor (DSP), a system on a chip (SoC), a microcontroller unit (MCU), or the like, or any combination thereof. In some embodiments, the processing device 140 may be a single server or a server group. The server group may be centralized or distributed. In some embodiments, the processing device 140 may be local or remote. For example, the processing device 140 may access information and/or data from the imaging device 110, the terminal device 130, and/or the storage device 150 via the network 120. As another example, the processing device 140 may be directly connected to the imaging device 110, the terminal device 130, and/or the storage device 150 to access information and/or data. In some embodiments, the processing device 140 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the processing device 140 may be implemented on a computing device 200 having one or more components illustrated in FIG. 2 in the present disclosure.

The storage device 150 may store data, instructions, and/or any other information. In some embodiments, the storage device 150 may store data obtained from the terminal device 130 and/or the processing device 140. For example, the storage device 150 may store one or more images obtained from the processing device 140. In some embodiments, the storage device 150 may store data and/or instructions that the processing device 140 may execute or use to perform exemplary methods/systems described in the present disclosure. In some embodiments, the storage device 150 may include a mass storage device, a removable storage device, a volatile read-and-write memory, a read-only memory (ROM), or the like, or any combination thereof. Exemplary mass storage devices may include a magnetic disk, an optical disk, a solid-state drive, etc. Exemplary removable storage devices may include a flash drive, a floppy disk, an optical disk, a memory card, a zip disk, a magnetic tape, etc. Exemplary volatile read-and-write memories may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 150 may be implemented on a cloud platform as described elsewhere in the disclosure.

In some embodiments, the storage device 150 may be connected to the network 120 to communicate with one or more other components of the imaging system 100 (e.g., the processing device 140, the terminal device 130, etc.). One or more components of the imaging system 100 may access the data or instructions stored in the storage device 150 via the network 120. In some embodiments, the storage device 150 may be part of the processing device 140.

It should be noted that the above description of the imaging system 100 is merely provided for the purposes of illustration, and not intended to limit the scope of the present disclosure. For persons having ordinary skills in the art, multiple variations and modifications may be made under the teachings of the present disclosure. For example, the assembly and/or function of the imaging system 100 may be varied or changed according to specific implementation scenarios.

Figure 2:
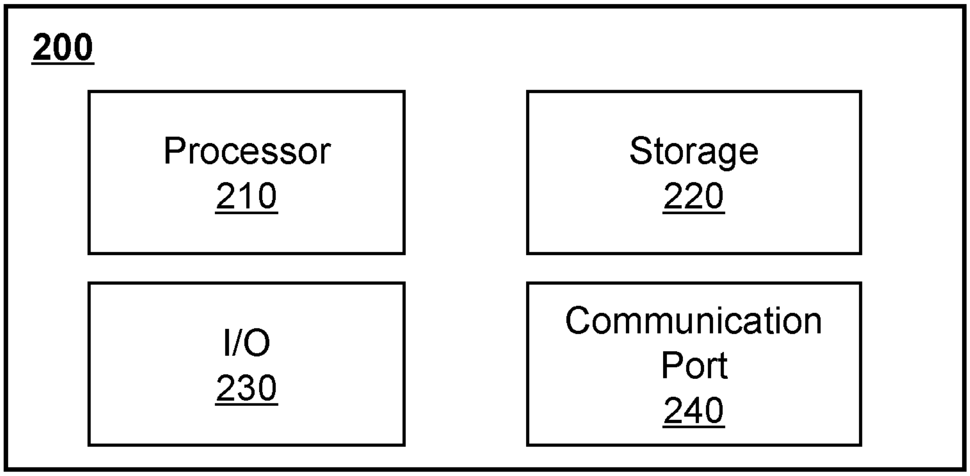
FIG. 2 is a schematic diagram illustrating exemplary hardware and/or software components of a computing device according to some embodiments of the present disclosure.

FIG. 2 is a schematic diagram illustrating hardware and/or software components of an exemplary computing device 200 on which the processing device 140 may be implemented according to some embodiments of the present disclosure. As illustrated in FIG. 2, the computing device 200 may include a processor 210, a storage 220, an input/output (I/O) 230, and a communication port 240.

The processor 210 may execute computer instructions (program codes) and perform functions of the processing device 140 in accordance with techniques described herein. The computer instructions may include, for example, routines, programs, objects, components, signals, data structures, procedures, modules, and functions, which perform particular functions described herein. For example, the processor 210 may process data obtained from the imaging device 110, the terminal device 130, the storage device 150, and/or any other component of the imaging system 100. In some embodiments, the processor 210 may include one or more hardware processors, such as a microcontroller, a microprocessor, a reduced instruction set computer (RISC), an application-specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field-programmable gate array (FPGA), an advanced RISC machine (ARM), a programmable logic device (PLD), any circuit or processor capable of executing one or more functions, or the like, or any combinations thereof.

Merely for illustration, only one processor is described in the computing device 200. However, it should be noted that the computing device 200 in the present disclosure may also include multiple processors. Thus operations and/or method steps that are performed by one processor as described in the present disclosure may also be jointly or separately performed by the multiple processors. For example, if in the present disclosure the processor of the computing device 200 executes both operation A and operation B, it should be understood that operation A and operation B may also be performed by two or more different processors jointly or separately in the computing device 200 (e.g., a first processor executes operation A and a second processor executes operation B, or the first and second processors jointly execute operations A and B).

The storage 220 may store data/information obtained from the imaging device 110, the terminal device 130, the storage device 150, and/or any other component of the imaging system 100. In some embodiments, the storage 220 may include a mass storage device, a removable storage device, a volatile read-and-write memory, a read-only memory (ROM), or the like, or any combination thereof. In some embodiments, the storage 220 may store one or more programs and/or instructions to perform exemplary methods described in the present disclosure. For example, the storage 220 may store a program for the processing device 140 for reconstructing a target image of a subject.

The I/O 230 may input or output signals, data, and/or information. In some embodiments, the I/O 230 may enable user interaction with the processing device 140. In some embodiments, the I/O 230 may include an input device and an output device. Exemplary input devices may include a keyboard, a mouse, a touch screen, a microphone, or the like, or a combination thereof. Exemplary output devices may include a display device, a loudspeaker, a printer, a projector, or the like, or a combination thereof. Exemplary display devices may include a liquid crystal display (LCD), a light-emitting diode (LED)-based display, a flat panel display, a curved screen, a television device, a cathode ray tube (CRT), or the like, or a combination thereof.

The communication port 240 may be connected with a network (e.g., the network 120) to facilitate data communications. The communication port 240 may establish connections between the processing device 140 and the imaging device 110, the terminal device 130, or the storage device 150. The connection may be a wired connection, a wireless connection, or a combination of both that enables data transmission and reception. The wired connection may include an electrical cable, an optical cable, a telephone wire, or the like, or any combination thereof. The wireless connection may include a Bluetooth network, a Wi-Fi network, a WiMax network, a WLAN, a ZigBee network, a mobile network (e.g., 3G, 4G, 5G, etc.), or the like, or any combination thereof. In some embodiments, the communication port 240 may be a standardized communication port, such as RS232, RS485, etc. In some embodiments, the communication port 240 may be a specially designed communication port. For example, the communication port 240 may be designed in accordance with the digital imaging and communications in medicine (DICOM) protocol.

Figure 3:
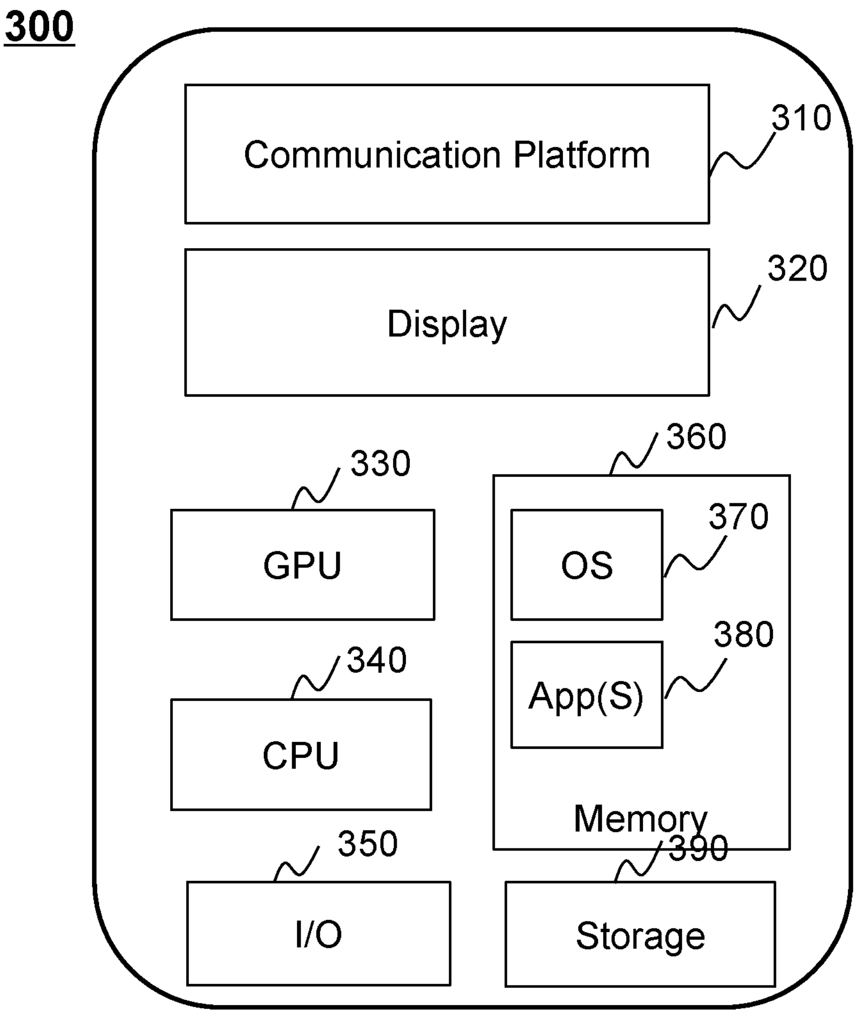
FIG. 3 is a schematic diagram illustrating exemplary hardware and/or software components of a mobile device according to some embodiments of the present disclosure.

FIG. 3 is a schematic diagram illustrating hardware and/or software components of an exemplary mobile device 300 according to some embodiments of the present disclosure. As illustrated in FIG. 3, the mobile device 300 may include a communication platform 310, a display 320, a graphics processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, an operating system 370 (OS) (e.g., iOS, Android, Windows Phone, etc.) and one or more applications 380 may be loaded into the memory 360 from the storage 390 in order to be executed by the CPU 340. The applications 380 may include a browser or any other suitable mobile apps for receiving and rendering information relating to image processing or other information from the processing device 140. User interactions with the information stream may be achieved via the I/O 350 and provided to the processing device 140 and/or other components of the imaging system 100 via the network 120.

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies to generate an image as described herein. A computer with user interface elements may be used to implement a personal computer (PC) or another type of work station or terminal device, although a computer may also act as a server if appropriately programmed. It is believed that those skilled in the art are familiar with the structure, programming and general operation of such computer equipment and as a result, the drawings should be self-explanatory.

Figure 4:
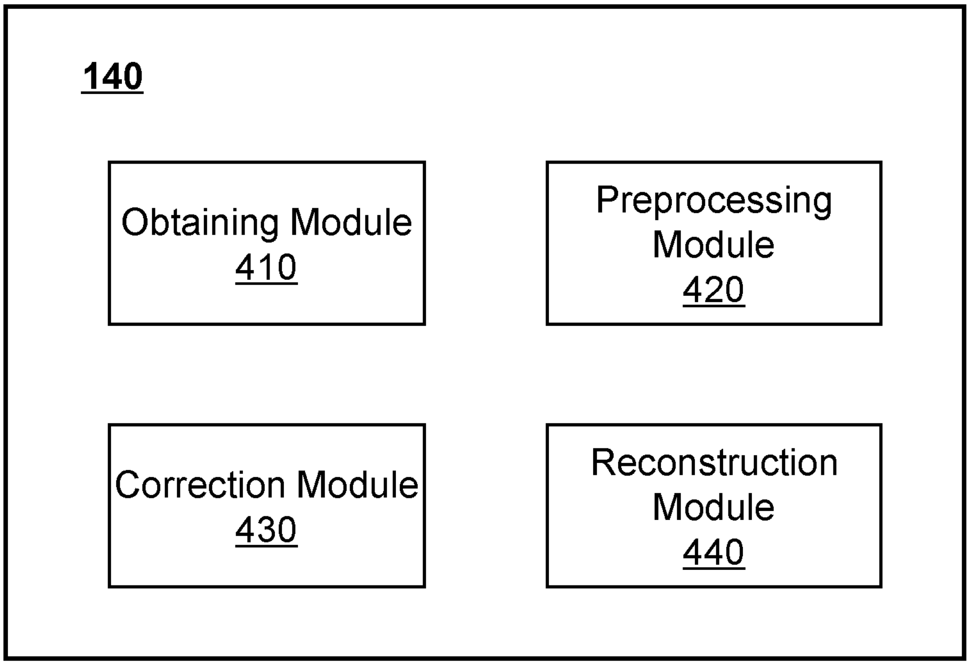
FIG. 4 is a block diagram illustrating an exemplary processing device according to some embodiments of the present disclosure.

FIG. 4 is a schematic block diagram illustrating an exemplary processing device according to some embodiments of the present disclosure. The processing device 140 may include an obtaining module 410, a preprocessing module 420, a correction module 430, and a reconstruction module 440.

The obtaining module 410 may be configured to obtain a projection image of a subject acquired by an imaging device. The obtaining module 410 may further be configured to obtain a raw projection image of the subject.

The preprocessing module 420 may be configured to perform a preprocessing operation on the raw projection image to generate the projection image. In some embodiments, the preprocessing module 420 may perform an air correction operation on the projection image.

The correction module 430 may be configured to use first pixel values of first pixels in the first region to correct second pixel values of second pixels in the second region. Specifically, the correction module 430 may select data of a certain row of the projection image. The correction module 430 may correct the second pixel values of the second pixels in the certain row one by one starting from a second pixel adjacent to the first region in the certain row. Similarly, the correction module 430 may correct second pixel values of the second pixels in the other rows. For example, the correction module 430 may determine a current second pixel to be corrected in the second region and a value reference pixel corresponding to the current second pixel. The correction module 430 may determine a gradient reference pixel in the first region. The correction module 430 may determine a local pixel gradient value of the gradient reference pixel. The correction module 430 may determine the corrected second pixel value of the current second pixel based on a reference pixel value of the value reference pixel and the local pixel gradient value of the gradient reference pixel.

The reconstruction module 440 may be configured to reconstruct a target image of the subject based on the first pixel values of the first pixels in the first region and the corrected second pixel values of the second pixels in the second region. In some embodiments, the reconstruction module 440 may reconstruct a 3D image of the subject based on multiple projection images.

It should be noted that the above description is merely provided for the purposes of illustration, and is not intended to limit the scope of the present disclosure. For persons having ordinary skills in the art, multiple variations and modifications may be made under the teachings of the present disclosure. However, those variations and modifications do not depart from the scope of the present disclosure. In some embodiments, two or more of the modules may be combined as a single module, and any one of the modules may be divided into two or more units. For example, the obtaining module 410 and the preprocessing module 420 may be combined as a single module configured to both obtain and preprocess the projection image. As another example, the correction module 430 may be divided into three units, such as a pixel determination unit, a pixel gradient value determination unit, and a pixel value correction unit. The pixel determination unit may be configured to determine the current second pixel to be corrected and the corresponding value reference pixel. The pixel gradient value determination unit may be configured to determine the gradient reference pixel and the local pixel gradient value of the gradient reference pixel. The pixel value correction unit may be configured to determine the corrected second pixel value of the current second pixel.

Figure 5:
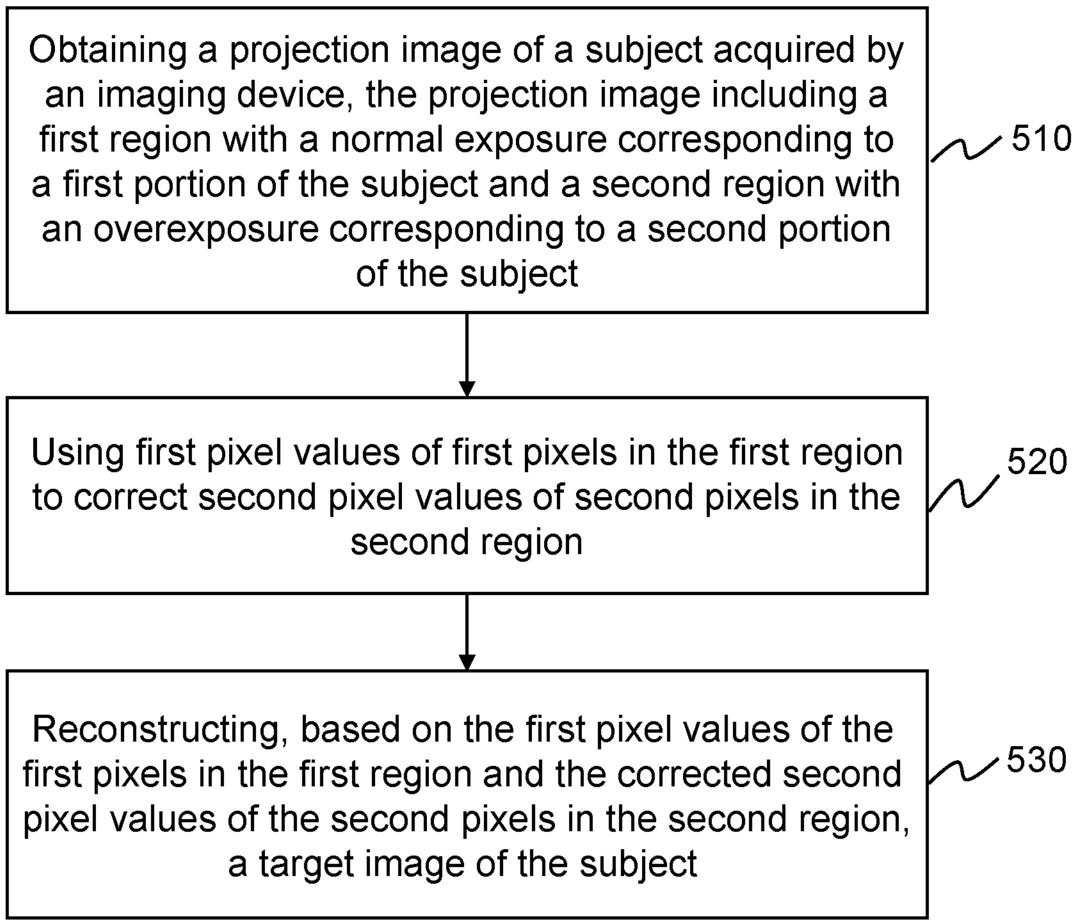
FIG. 5 is a flowchart illustrating an exemplary process for image reconstruction according to some embodiments of the present disclosure.

FIG. 5 is a flowchart illustrating an exemplary process for image reconstruction according to some embodiments of the present disclosure. In some embodiments, the process 500 may be implemented as a set of instructions (e.g., an application) stored in the storage device 150, the storage 220, or the storage 390. The processing device 140, the processor 210, and/or the CPU 340 may execute the set of instructions, and when executing the instructions, the processing device 140, the processor 210, and/or the CPU 340 may be configured to perform the process 500. The operations of the illustrated process 500 presented below are intended to be illustrative. In some embodiments, the process 500 may be accomplished with one or more additional operations not described and/or without one or more of the operations discussed. Additionally, the order of the operations of the process 500 illustrated in FIG. 5 and described below is not intended to be limiting.

In 510, the processing device 140 (e.g., the obtaining module 410) may obtain a projection image of a subject acquired by an imaging device. The subject may be biological or non-biological. For example, the subject may include a patient, a man-made object, etc. as described elsewhere in the present disclosure (e.g., FIG. 1 and the descriptions thereof).

The imaging device may include a gantry, one or more detectors, a table, a radiation source, a detection region, etc., in connection with the imaging device 110 as described in FIG. 1. For example, the radiation source may generate and/or emit radiation rays (e.g., X-rays, γ-rays, α-rays, etc.) to scan the subject that is placed on the table. The detector may detect the radiation beams through the subject within the detection region. The detector may covert the radiation beams through the subject into an electrical signal, and then convert the electrical signal into digital information (i.e., raw imaging data or raw projection image) by an analog/digital converter. A pixel value of each pixel of the raw projection image may represent a ray intensity value of radiation beams that through substances of the subject on a ray path. The processing device 140 (e.g., the preprocessing module 420) may process the raw projection image to generate the projection image. Therefore, the raw projection image (or the projection image) of the subject may be associated with a dose of radiation beams detected by the detector. However, since the detector has its own detection range, when the dose of radiation beams through the subject exceeds the detection range of the detector, data (e.g., a ray intensity value) detected by the detector may remain unchanged after reaching a maximum detection value corresponding to the detector, which may cause the raw projection image (or the projection image) to not reflect actual information (e.g. structure information) of the subject. When the dose of radiation beams through the subject is too small, the noise in a reconstructed image of the subject may be increased, so as to decrease the signal-to-noise ratio (SNR) of the reconstructed image, reduce the contrast of the reconstructed image, and even make some smaller structural information invisible to the naked eye.

In some embodiments, geometric structures of different portions of the subject may not be consistent. For example, the head of a patient may resemble an ellipsoid structure, i.e., the edge portion of the head may be thinner than the central portion of the head. In such cases, when the head of the patient is scanned with the imaging device, in order to have a high SNR in the central portion of the head in a reconstructed image of the patient, the edge portion of the head and the air may be overexposed. Thus, if the raw projection image (or the projection image) is directly used for image reconstruction, the edge portion of the head in the reconstructed image may be too dark or too bright. In other words, the reconstructed image may be truncated, i.e., the reconstructed image may have a truncation artifact.

The projection image may be imaging data of the subject before image reconstruction. A pixel value of each pixel of the projection image may represent a line integral of attenuation coefficients of substances of the subject on a ray path. If a pixel value of a pixel in the projection image is acquired based on scanning the air, the pixel value may be zero. In some embodiments, the processing device 140 may obtain the projection image from the imaging device 110, the storage device 150, or any other storage device. For example, the imaging device 110 (e.g., a CBCT device) may transmit acquired imaging data (i.e., the projection image) to the storage device 150 for storage. The processing device 140 may obtain the projection image from the storage device 150 or any other storage device. As another example, the processing device 140 may obtain the projection image from the imaging device directly.

The projection image may include a first region with a normal exposure corresponding to a first portion of the subject and a second region with an overexposure corresponding to a second portion of the subject. As used herein, the first region with the normal exposure corresponding to the first portion of the subject may refer to imaging data generated based on raw imaging data acquired by the detector of the imaging device when a dose of radiation beams through the first portion of the subject is within a detection range of the detector. The second region with the overexposure corresponding to the second portion of the subject may refer to imaging data generated based on raw imaging data acquired by the detector of the imaging device when a dose of radiation beams through the second portion of the subject exceeds the detection range of the detector. In other words, the first region of the projection image may have first pixels with first pixel values (e.g., a line integral of attenuation coefficients of voxels on a ray path) that can reflect actual information of the first portion (e.g., the central portion) of the subject, while the second region of the projection image may have second pixels with second pixel values that cannot reflect actual information of the second portion (e.g., the edge portion) of the subject.

In some embodiments, the processing device 140 (e.g., the preprocessing module 420) may perform a preprocessing operation on the raw projection image to generate the projection image. In some embodiments, the preprocessing operation may include an image segmentation (or identification operation), an air correction operation, a filtering operation, an enhancement operation, or the like, or any combination thereof. For example, the processing device 140 may perform the image segmentation operation on the raw projection image to identify or determine the first region and the second region. As another example, the processing device 140 may perform the air correction operation to obtain an air corrected raw projection image.

It should be noted that the execution order of the image segmentation (or identification) operation and the air correction operation may be serial execution, but the order of the image segmentation (or identification) operation and the air correction operation is not intended to be limiting. In some embodiments, the processing device 140 may first perform the image segmentation operation on the raw projection image to determine the first region and the second region, and then perform the air correction operation on the segmented raw projection image to generate the air corrected segmented projection image. For example, the processing device 140 may determine the first region and the second region according to a maximum pixel value among pixel values of pixels of the raw projection image. Specifically, the processing device 140 may determine a region in which all pixels have the maximum pixel value and a count of the pixels exceeds a threshold as the second region. The processing device 140 may determine the rest region of the projection image as the first region. Then the processing device 140 may perform the air correction operation on the first region and the second region to determine the air corrected first region and the air corrected second region. In some alternative embodiments, the processing device 140 may first perform the air correction operation on the raw projection image, and then perform the image segmentation operation on the air corrected raw projection image to determine the air corrected first region and the air corrected second region.

In some embodiments, the processing device 140 may obtain an air projection image acquired by the imaging device scanning the air (i.e., nothing on the table). The processing device 140 may perform the air correction operation on the raw projection image of the subject based on the air projection image. In some embodiments, after the projection image is obtained, the processing device 140 may perform the air correction operation on the projection image. In some embodiments, the processing device 140 may assign each second pixel value of each second pixel in the second region of the air corrected projection image to a value of zero. For illustration purposes, the projection image may be taken as an example for description in the present disclosure, which is not intended to be limiting. It should be noted that the processing device 140 can also perform subsequent operations based on the processed projection image, for example, correcting the second pixel values of the second pixels, reconstructing a target image of the subject, etc.

In 520, the processing device 140 (e.g., the correction module 430) may use first pixel values of first pixels in the first region to correct second pixel values of second pixels in the second region.

As described above, in order to ensure the quality of the reconstructed image (i.e., the target image), the second pixel values of the second pixels in the second region (i.e., the truncated part of the projection image) may be corrected, for example, using the first pixel values of the first pixels in the first region. In other words, imaging data with the overexposure may be corrected according to imaging data with the normal exposure. The processing device 140 may estimate or redetermine second pixel values of the second pixels in the second region.

In some embodiments, the second region may be adjacent to the first region. The processing device 140 may correct, using the first pixel values of the first pixels in the first region, the second pixel values of the second pixels in the second region one by one starting from a second pixel adjacent to the first region. Specifically, the processing device 140 may select data of a certain row of the projection image. The processing device 140 may correct the second pixel values of the second pixels in the certain row one by one starting from a second pixel adjacent to the first region in the certain row. Similarly, the processing device 140 may correct second pixel values of the second pixels in the other rows. For example, the processing device 140 may determine a current second pixel to be corrected in the second region and a value reference pixel corresponding to the current second pixel. The processing device 140 may determine a gradient reference pixel in the first region. The processing device 140 may determine a local pixel gradient value of the gradient reference pixel. The processing device 140 may determine the corrected second pixel value of the current second pixel based on a reference pixel value of the value reference pixel and the local pixel gradient value of the gradient reference pixel. More descriptions for correcting the second pixel values of the second pixels in the second region may be found elsewhere in the present disclosure (e.g., FIG. 6 and FIG. 7 and the descriptions thereof).

In 530, the processing device 140 (e.g., the reconstruction module 440) may reconstruct a target image of the subject based on the first pixel values of the first pixels in the first region and the corrected second pixel values of the second pixels in the second region.

In some embodiments, the processing device 140 may obtain multiple projection images of the subject at different view angles. The processing device 140 may correct the second region in each projection image based on the first region in the projection image. The processing device 140 may reconstruct the target image of the subject based on the first pixel values of the first pixels in the first region in each projection image and the corrected second pixel values of the second pixels in the second region in each projection image. In some embodiments, the processing device 140 may reconstruct a 3D image of the subject based on multiple projection images.

In some embodiments, the processing device 140 may reconstruct the target image of the subject using a filter back-projection (FBP) algorithm, a feldkamp (FDK) algorithm, an adaptive statistical iterative reconstruction (ASIR) algorithm, a simultaneous iterative reconstruction technique (SIRT), a neural network model, or the like, or any combination thereof. It should be noted that the target image reconstructed based on the first region and the corrected second correction region may also be reconstructed by using other image reconstruction techniques, which is not limited in the present disclosure.

According to some embodiments of the present disclosure, on the basis of retaining the actual information (i.e., the imaging data in the first region), using the imaging data with the normal exposure to correct the imaging data with the overexposure ensures the accuracy of data used for image reconstruction, thereby reducing image artifacts caused by overexposure in the reconstructed image, and improving the image quality of the reconstructed image.

It should be noted that the above description is merely provided for the purposes of illustration, and is not intended to limit the scope of the present disclosure. For persons having ordinary skills in the art, multiple variations and modifications may be made under the teachings of the present disclosure. However, those variations and modifications do not depart from the scope of the present disclosure.

Figure 6:
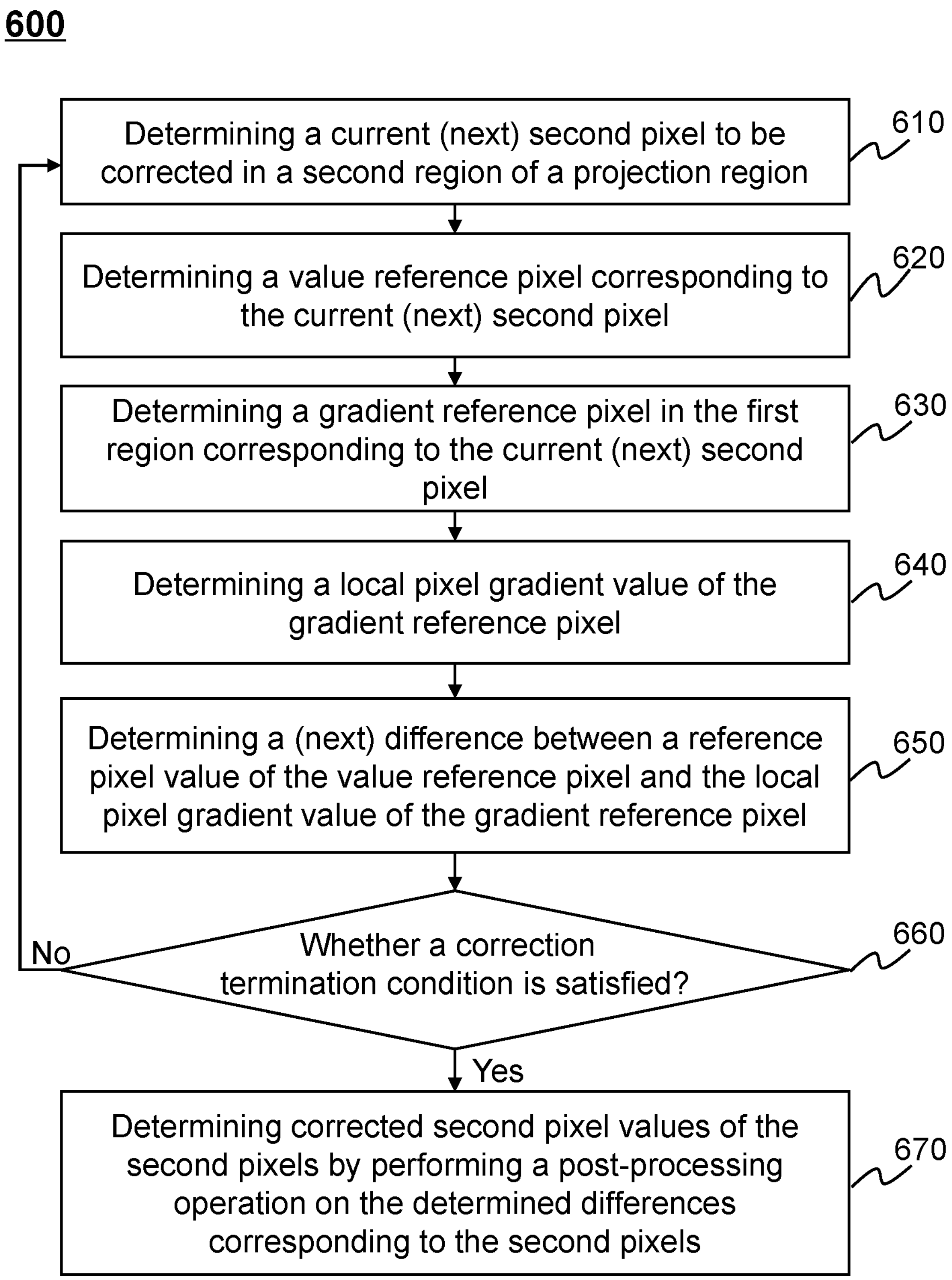
FIG. 6 is a flowchart illustrating an exemplary process for image correction according to some embodiments of the present disclosure.

FIG. 6 is a flowchart illustrating an exemplary process for image correction according to some embodiments of the present disclosure. In some embodiments, the process 600 may be implemented as a set of instructions (e.g., an application) stored in the storage device 150, the storage 220, or the storage 390. The processing device 140, the processor 210, and/or the CPU 340 may execute the set of instructions, and when executing the instructions, the processing device 140, the processor 210, and/or the CPU 340 may be configured to perform the process 600. The operations of the illustrated process 600 presented below are intended to be illustrative. In some embodiments, the process 600 may be accomplished with one or more additional operations not described and/or without one or more of the operations discussed. Additionally, the order of the operations of the process 600 illustrated in FIG. 6 and described below is not intended to be limiting.

It should be noted that, in some embodiments, a projection image may include a first region with a normal exposure and two or more second regions (e.g., second regions on the left, right, up, and/or down of the projection image) with an overexposure. For each second region, the processing device 140 may correct second pixel values of second pixels in each row one by one starting from a second pixel adjacent to the first region in the row. In this way, the second pixel values of the second pixels in the second region can be corrected one by one according to the continuity of the collected information in the projection image of the subject, thereby ensuring the accuracy of pixel value correction. For illustration purposes, a second region on the right of the projection image may be taken as an example for description in the present disclosure, which is not intended to be limiting.

In 610, the processing device 140 (e.g., the correction module 430) may determine a current second pixel to be corrected in a second region of a projection image. The projection image may include a first region with a normal exposure corresponding to a first portion of the subject and a second region with an overexposure corresponding to a second portion of the subject. The first region may be adjacent to the second region.

In some embodiments, for a specific row of the projection image, the processing device 140 may determine a second pixel adjacent to the first region in the specific row as the current second pixel. Specifically, if the second region is on the right of the projection image, the processing device 140 may designate the last first pixel in the first region of the specific row, counted from left to right, as a critical pixel (e.g., pixel $k_{end}$ illustrated in FIG. 7). The processing device 140 may determine the second pixel adjacent to the critical pixel as the current second pixel (e.g., pixel $k_{end+1}$ illustrated in FIG. 7). In some embodiments, after the current second pixel is corrected, the processing device 140 may determine a second pixel in the specific row that is adjacent to the previously corrected second pixel and is uncorrected as the current second pixel.

In 620, the processing device 140 (e.g., the correction module 430) may determine a value reference pixel corresponding to the current second pixel. The value reference pixel may be a first pixel in the first region or a corrected second pixel in the second region.

In some embodiments, the value reference pixel may be adjacent to the current second pixel. For example, if the current second pixel is the first one of second pixels to be corrected in the specific row (e.g., pixel $k_{end+1}$ illustrated in FIG. 7), the processing device 140 may determine a first pixel (e.g., pixel $k_{end}$ illustrated in FIG. 7) in the specific row and adjacent to the current second pixel as the value reference pixel. As another example, if the current second pixel is not the first one of second pixels to be corrected in the specific row (e.g., pixel $k_{end+2}$ illustrated in FIG. 7), the processing device 140 may determine a corrected second pixel (e.g., pixel $k_{end+1}$ illustrated in FIG. 7) located in the specific row and adjacent to the current second pixel as the value reference pixel.

In some embodiments, the processing device 140 may determine the value reference pixel based on characteristics of the subject. For example, if the subject has a symmetric structure, the processing device 140 may determine a first pixel in the first region that is symmetrical in position with the current second pixel and belongs to the same organizational attribute as the value reference pixel. As another example, the processing device 140 may determine a first pixel in the first region that belongs to the same organizational attribute as the current second pixel and is closest to the current second pixel as the value reference pixel.

In 630, the processing device 140 (e.g., the correction module 430) may determine a gradient reference pixel in the first region corresponding to the current second pixel.

In some embodiments, the processing device 140 may determine a first pixel located in the specific row and symmetrical with the current second pixel with respect to the critical pixel as the gradient reference pixel. For example, if the current second pixel is the first one of second pixels to be corrected in the specific row (e.g., pixel $k_{end+1}$ illustrated in FIG. 7), the processing device 140 may determine a first pixel (e.g., pixel $k_{end-1}$ illustrated in FIG. 7) in the specific row and adjacent to the value reference pixel (e.g., pixel $k_{end}$ illustrated in FIG. 7) as the gradient reference pixel.

In some embodiments, if the current second pixel is not the first one of second pixels to be corrected in the specific row (e.g., pixel $k_{end+m}$ illustrated in FIG. 7), the processing device 140 may determine a corrected second pixel (e.g., pixel $k_{end+m-2}$, not shown in FIG. 7) in the specific row and adjacent to the value reference pixel (e.g., pixel $k^{end+m-1}$, not shown in FIG. 7) as the gradient reference pixel.

In 640, the processing device 140 (e.g., the correction module 430) may determine a local pixel gradient value of the gradient reference pixel. In some embodiments, the local pixel gradient value of the gradient reference pixel may include a left local pixel gradient value, a right local pixel gradient value, a central local pixel gradient value, etc.

In some embodiments, the local pixel gradient value may be determined based on two gradient estimation pixels in the specific row associated with the gradient reference pixel. In some embodiments, the processing device 140 may determine a pixel interval including the gradient reference pixel. The processing device 140 may determine the two gradient estimation pixels based on the pixel interval. In other words, the two gradient estimation pixels may be determined based on a count of pixels separated between the two gradient estimation pixels. For example, the processing device 140 may designate the gradient reference pixel as one of the two gradient estimation pixels. The processing device 140 may designate a pixel (e.g., a first pixel or a corrected second pixel) located in the specific row and separated by a first count of pixels as another gradient estimation pixel. As another example, the processing device 140 may designate a pixel (e.g., a first pixel or a corrected second pixel) located in the specific row and separated by a second count of pixels as one of the two gradient estimation pixels. The processing device 140 may designate a pixel (e.g., a first pixel or a corrected second pixel) located in the specific row and separated by a third count of pixels as another gradient estimation pixel. The gradient reference pixel may be between the two gradient estimation pixels. In some embodiments, the first count, the second count, and/or the third count may be the same or different. In some embodiments, the first count, the second count, and/or the third count may be set according to a default setting of the imaging system 100 or preset by a user or operator via the terminal device 130.

In some embodiments, if the gradient reference pixel is one of the two gradient estimation pixels and the other gradient estimation pixel is to the left of the gradient reference pixel, the local pixel gradient value of the gradient reference pixel may also be referred to as the left local pixel gradient value of the gradient reference pixel. In some embodiments, if the gradient reference pixel is one of the two gradient estimation pixels and the other gradient estimation pixel is to the right of the gradient reference pixel, the local pixel gradient value of the gradient reference pixel may also be referred to as the right local pixel gradient value of the gradient reference pixel. In some embodiments, the second count may be same as or different from the third count. If the second count is the same as the third count, the two gradient estimation pixels may be symmetrical with respect to the gradient reference pixel. In such cases, the local pixel gradient value of the gradient reference pixel may also be referred to as the central local pixel gradient value of the gradient reference pixel.

The processing device 140 may determine the local pixel gradient value of the gradient reference pixel based on pixel values of the two gradient estimation pixels and a count of pixels spacing the two gradient estimation pixels. For example, the processing device 140 may determine a difference between two pixel values of the two gradient estimation pixels. The processing device 140 may further determine a count of pixels spacing the two gradient estimation pixels. The processing device 140 may determine the local pixel gradient value by dividing the difference by the count of pixels spacing the two gradient estimation pixels. It should be noted that a count of pixels spacing the two adjacent pixels may be determined as one.

In some embodiments, the local pixel gradient value may be determined based on multiple gradient estimation pixels in the specific row associated with the gradient reference pixel. For example, the processing device 140 may determine a local pixel gradient sub-value corresponding to each two adjacent gradient estimation pixels among the multiple gradient estimation pixels. The processing device 140 may determine an average value of the local pixel gradient sub-values as the local pixel gradient value of the gradient reference pixel. Alternatively, the processing device 140 may designate one of the local pixel gradient sub-values as the local pixel gradient value of the gradient reference pixel according to a preset condition. For example, the processing device 140 may designate the maximum (or minimum) value among the local pixel gradient sub-values as the local pixel gradient value.

In 650, the processing device 140 (e.g., the obtaining module 410) may determine a difference between a reference pixel value of the value reference pixel and the local pixel gradient value of the gradient reference pixel.

In 660, the processing device 140 (e.g., the correction module 430) may determine whether a correction termination condition is satisfied.

In response to determining that the correction termination condition is satisfied, the processing device 140 may determine corrected second pixel values of the second pixels by performing a post-processing operation on the determined second pixel values of the second pixels in the second region in operation 670. On the other hand, in response to determining that the correction termination condition is not satisfied, the processing device 140 may execute the process 600 to return to operation 610 to determine a next second pixel to be corrected in the second region. In other words, the processing device 140 may store the difference corresponding to the current second pixel, for example, in the storage device 150, and replace the current second pixel with the next second pixel. The processing device 140 may determine a value reference pixel corresponding to the next second pixel and a gradient reference pixel associated with the next second pixel. The processing device 140 may determine a local pixel gradient value of the gradient reference pixel and determine a next difference between a reference pixel value of the value reference pixel and the local pixel gradient value of the gradient reference pixel.

Further, the processing device 140 may determine whether the correction termination condition is satisfied. In response to determining that the correction termination condition is satisfied, the processing device 140 may proceed to perform operation 670. On the other hand, in response to determining that the correction termination condition still is not satisfied, the processing device 140 may still execute the process 600 to return to operation 610 and execute operations 620-660 until the correction termination condition is satisfied.

In 670, the processing device 140 (e.g., the correction module 430) may determine corrected second pixel values of the second pixels by performing a post-processing operation on the determined differences corresponding to the second pixels.

It should be noted that for a specific projection image of a spacing subject, second pixel values of second pixels in a second region may be greater than or equal to zero. Thus, the processing device 140 may determine that the correction is ended according to whether the determined second pixel value of the current second pixel is greater than or equal to zero.

Specifically, in some embodiments, the correction termination condition may include that the difference corresponding to the current second pixel is equal to zero. In such cases, in response to determining that the difference corresponding to the current second pixel is equal to zero, the processing device 140 may designate the determined differences corresponding to the second pixels as the corrected second pixel values of the second pixels and end the correction.

In some embodiments, the correction termination condition may include that the difference corresponding to the current second pixel is less than zero. In such cases, in response to determining that the difference corresponding to the current second pixel is less than zero, the processing device 140 may adjust the difference corresponding to the current second pixel to zero and end the correction. The processing device 140 may designate the determined differences corresponding to the second pixels before the current second pixel as their corresponding corrected second pixel values.

In some embodiments, the correction termination condition may include that a count of corrected second pixels reaches a threshold count and the difference corresponding to the current second pixel is greater than zero, or the current second pixel is the last pixel in the specific row and the difference corresponding to the current second pixel is greater than zero. In such cases, in response to determining that the correction termination condition is satisfied, the processing device 140 may determine weights for the determined differences of the second pixels. The processing device 140 may determine the corrected second pixel values of the second pixels in the second region based on the weights and the determined differences of the second pixels. In some embodiments, different second pixels may correspond to the same or different weights. In some embodiments, the count threshold may be determined according to a default setting of the imaging system 100 or preset by a user or operator via the terminal device 130. In some embodiments, the count threshold may be determined according to characteristics (e.g., the structure) of the subject and/or a dose of radiation beams of the radiation source of the imaging device.

In some embodiments, the processing device 140 may determine weights for the determined differences of the second pixels based on a preset model. In some embodiments, the preset model may include a sine function, a cosine function, or any other function that has a gradient range and can have a function value of zero in the gradient range. As used herein, the gradient range may refer a range in which values of the function is gradually changes. In some embodiments, the preset model may be determined based on pre-acquired projection image with a normal exposure of a phantom or other subject similar to the subject. For example, the processing device 140 may determine the weights for the determined differences of the second pixels by normalizing the pixel values of the pre-acquired projection image. In some embodiments, the preset model may be determined according to a default setting of the imaging system 100 or preset by a user or operator via the terminal device 130. More descriptions about the preset model may be found in FIG. 7 and the descriptions thereof.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the second region may be on the left side of the projection image. The processing device 140 may correct the second pixel values of the second pixels one by one from right to left.

Figure 7:
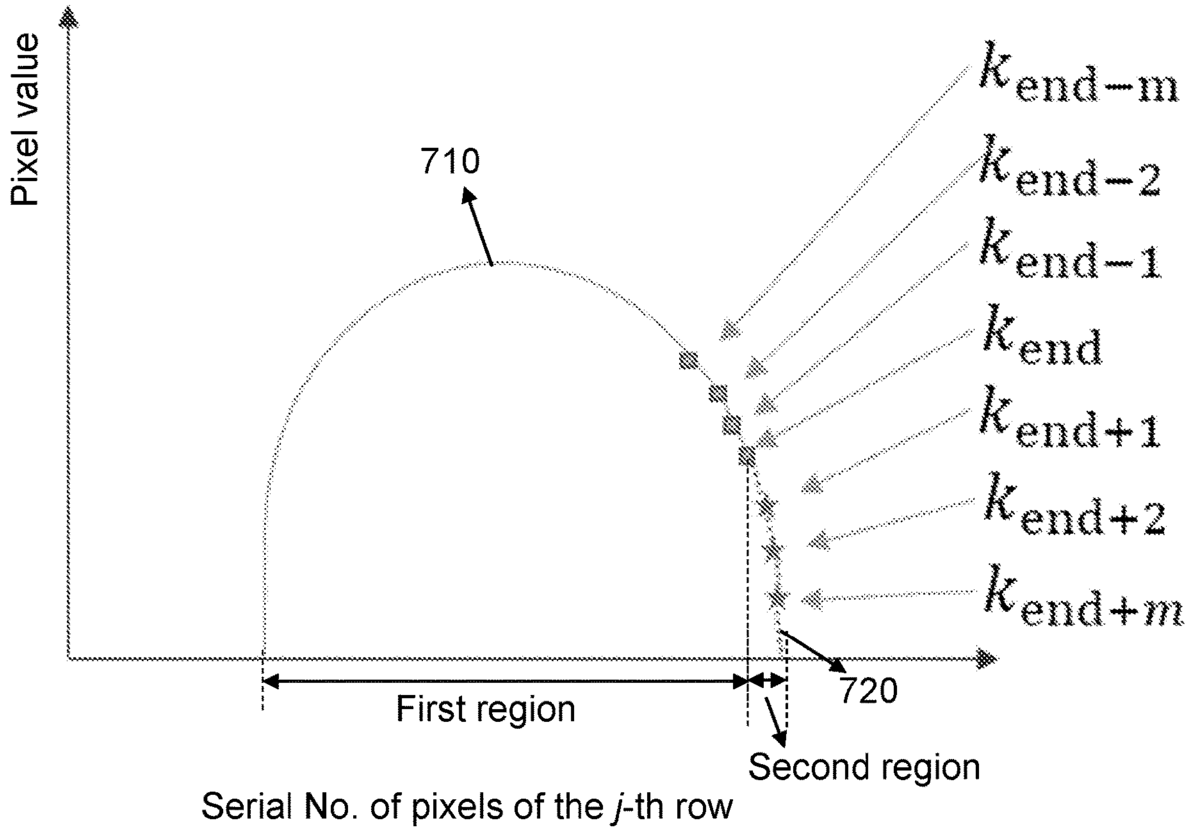
FIG. 7 is a schematic diagram illustrating pixels of a specific row in a projection image according to some embodiments of the present disclosure.

FIG. 7 is a schematic diagram illustrating pixels of a specific row in a projection image according to some embodiments of the present disclosure. Merely by way of example, the projection image has a truncation artifact on the right side of the projection image. As illustrated in FIG. 7, the horizontal axis represents a serial number of each pixel of the j-th row of the projection image and the vertical axis represents a pixel value of each pixel. Solid line 710 may represent first pixels in a first region with a normal exposure of the j-th row of the projection image. Dotted line 720 may represent second pixels in a second region with an overexposure of the j-th row of the projection image. Each second pixel value of each second pixel in the second region of the projection image may be assigned to a value of zero before correction.

$k_{end}$ denotes the last first pixel in the first region of the j-th row counted from left to right. In some embodiments, pixel $k_{end}$ may also be referred to as a critical pixel between the first region and the second region. $k_{end-m}$ denotes a first pixel separated by m pixels from the pixel $k_{end}$, wherein m≥1, and m is a positive integer. $k_{end+1}$ denotes the first second pixel counted from the pixel $k_{end}$. $k_{end+m}$ denotes a second pixel separated by m pixels from the pixel $k_{end}$. That is, pixel $k_{end+m}$ is the m-th second pixel counted from the pixel $k_{end}$.

For the j-th row of the projection image, the second pixel adjacent to the first region (i.e., pixel $k_{end+1}$) may be corrected first. Then, the processing device 140 may correct pixels $k_{end+1}$, $k_{end+2}$, . . . $k_{end+m}$, . . . one by one in sequence. Specifically, for the current second pixel to be corrected, the processing device 140 may determine a value reference pixel and a gradient reference pixel corresponding to the current second pixel. The processing device 140 may determine a local pixel gradient value of the gradient reference pixel. The processing device 140 may determine a corrected second pixel value of the current second pixel based on a reference pixel value of the value reference pixel and the local pixel gradient value of the gradient reference pixel.

For example, the corrected second pixel value of the first second pixel may be determined according to Equation (1) as follows:

$$V_{k_{end+1}}=V_{k_{end}}-G_{k_{end-1}}, \tag{1}$$

where $V_{k_{end+1}}$ denotes a pixel value of the current second pixel to be corrected (i.e., pixel $k_{end+1}$); $V_{k_{end}}$ denotes a pixel value of the value reference pixel (i.e., pixel $k_{end}$) corresponding to pixel $k_{end+1}$; $G_{k_{end-1}}$ denotes a local pixel gradient value of the gradient reference pixel (i.e., pixel $k_{end-1}$) corresponding to pixel $k_{end+1}$.

After the first second pixel is corrected, the processing device 140 may correct the second pixel value of a next second pixel adjacent to the first second pixel. The corrected second pixel value of the next second pixel (i.e., pixel $k_{end+2}$) may be determined according to Equation (2) as follows:

$$V_{k_{end+2}}=V_{k_{end+1}}-G_{k_{end-2}}, \tag{2}$$

where $V_{k_{end+2}}$ denotes a pixel value of the current second pixel (i.e., pixel $k_{end+2}$); $V_{k_{end+1}}$ denotes a pixel value of the value reference pixel (i.e. pixel $k_{end+1}$) corresponding to pixel $k_{end+2}$; $G_{k_{end-2}}$ denotes a local pixel gradient value of the gradient reference pixel (i.e., pixel $k_{end-2}$) corresponding to pixel $k_{end+2}$.

Similarly, the processing device 140 may correct the second pixel value of the m-th second pixel (i.e., pixel $k_{end+m}$) according to Equation (3) as follows:

$$V_{k_{end+m}}=V_{k_{end+m-1}}-G_{k_{end-m}}, \tag{3}$$

where $V_{k_{end+m}}$ in denotes a pixel value of the current second pixel (i.e., pixel $k_{end+m}$); $V_{k_{end+m-1}}$ denotes a pixel value of the value reference pixel (i.e. pixel $k_{end+m-1}$) corresponding to pixel $k_{end+m}$; $G_{k_{end-m}}$ denotes a local pixel gradient value of the gradient reference pixel (i.e., pixel $k_{end-m}$) corresponding to pixel $k_{end+m}$.

In some embodiments, the local pixel gradient value of the gradient reference pixel (i.e., pixel $k_{end-m}$) may include a left local pixel gradient value, a right local pixel gradient value, a central local pixel gradient value, etc. Merely by way of example, the processing device 140 may determine the left local pixel gradient value of pixel $k_{end-m}$ (i.e., the gradient reference pixel) according to Equation (4) as follows:

$$G_{k_{end-m}}=\frac{V_{k_{end-m-n}}-V_{k_{end-m}}}{n}, \tag{4}$$

where $V_{k_{end-m-n}}$ denotes a pixel value of one of two gradient estimation pixels (i.e., pixel $k_{end-m-n}$, wherein n is a positive integer, e.g., n may be 1, 2, 3, 4, etc.); $V_{k_{end-m}}$ denotes a pixel value of another gradient estimation pixel (i.e., pixel $k_{end-m}$). That is, the left local pixel gradient value $G_{k_{end-m}}$ may be determined based on pixel values of pixel $k_{end-m}$ and a pixel to the left of pixel $k_{end-m}$.

In some embodiments, the processing device 140 may determine the right local pixel gradient value of pixel $k_{end-m}$ according to Equation (5) as follows:

$$G_{k_{end-m}}=\frac{V_{k_{end-m}}-V_{k_{end-m+n}}}{n}, \tag{5}$$

where $V_{k_{end-m+n}}$ denotes a pixel value of one of two gradient estimation pixels (i.e., pixel $k_{end-m+n}$). That is, the right local pixel gradient value $G_{k_{end-m}}$ may be determined based on pixel values of pixel $k_{end-m}$ and a pixel to the right of pixel $k_{end-m}$.

In some embodiments, the processing device 140 may determine the central local pixel gradient value of pixel $k_{end-m}$ according to Equation (6) as follows:

$$G_{k_{end-m}}=\frac{V_{k_{end-m-n}}-V_{k_{end-m+n}}}{2/n}. \tag{6}$$

That is, the central local pixel gradient value $G_{k_{end-m}}$ may be determined based on pixel values of two symmetrical pixels centered on pixel $k^{end-m}$.

In some embodiments, the processing device 140 may perform a post-processing operation on the corrected second values of the second pixels (or the corrected second pixels). For example, if a corrected second value of the current second pixel (e.g., pixel $k_{end+m}$) is less than or equal to zero, the processing device 140 may adjust the corrected second value of the current second pixel to zero and end the correction. The processing device 140 may designate the corrected second values of the second pixels (i.e., pixels $k_{end+1}$, $k_{end+2}$, . . . , $k_{end+m-1}$) before the current second pixel as their corresponding target corrected second pixel values. The processing device 140 may reconstruct a target image based on the first pixel values of the first pixels in the first region and the target corrected second pixel values of the second pixels in the second region.

As another example, if the current second pixel (e.g., pixel $k_{end+m}$) is the last second pixel in the j-th row or a count (e.g., m) of the corrected second pixels reaches a threshold count, and a corrected second value of the current second pixel is greater than zero, the processing device 140 may determine weights for the corrected second value of the second pixels (i.e., pixels $k_{end+1}$, $k_{end+2}$, . . . , $k_{end+m}$). The processing device 140 may determine target corrected second pixel values of the second pixels in the second region based on the weights and the corrected second value of the second pixels. For example, the processing device 140 may determine the target corrected second pixel values by multiplying the corrected second pixel values by the corresponding weight.

In some embodiments, the processing device 140 may determine weights for the corrected second values of the second pixels based on a preset model as described in FIG. 6. Merely by way of example, the preset model may be determined as Equation (7) as follows:

$$y = \frac{1}{p-1} \times x, \tag{7}$$

where, y denotes weights for processing the corrected second pixel values of the corrected second pixels, p denotes a count of the corrected second pixels, x may be equal to p−1, p−2, . . . , 1, 0. If p=6 (i.e., the corrected second pixels may include pixels $k_{end+1}$, $k_{end+2}$, . . . , $k_{end+6}$), y=[1.0, 0.8, 0.6, 0.4, 0.2, 0]. The target corrected second pixel values of pixels $k_{end+1}$, $k_{end+2}$, . . . , $k_{end+6}$ may be determined according to Equations (8-13) as follows:

$$V_{k_{end+1}}{}^* = V_{k_{end+1}} \times 1.0, \tag{8}$$

$$V_{k_{end+2}}{}^* = V_{k_{end+1}} \times 0.8, \tag{9}$$

$$V_{k_{end+3}}{}^* = V_{k_{end+3}} \times 0.6, \tag{10}$$

$$V_{k_{end+4}}{}^* = V_{k_{end+4}} \times 0.4, \tag{11}$$

$$V_{k_{end+5}}{}^* = V_{k_{end+5}} \times 0.2, \tag{12}$$

$$V_{k_{end+6}}{}^* = V_{k_{end+6}} \times 1.0, \tag{13}$$

where, $$V_{k_{end+1}}^*$$

denotes the target corrected second pixel value of pixel $k_{end+1}$, $$V_{k_{end+2}}^*$$

denotes the target corrected second pixel value of pixel $$k_{end+2},\ V_{k_{end+3}}^*$$

denotes the target corrected second pixel value of pixel $$k_{end+3},\ V_{k_{end+4}}^*$$

denotes the target corrected second pixel value of pixel $$k_{end+4},\ V_{k_{end+5}}^*$$

denotes the target corrected second pixel value of pixel $$k_{end+5},\ \text{and}\ V_{k_{end+6}}^*$$

denotes the target corrected second pixel value of pixel $k_{end+6}$. The processing device 140 may reconstruct a target image based on the first pixel values of the first pixels in the first region and the target corrected second pixel values of the second pixels in the second region.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer-readable media having computer-readable program code embodied thereon.

A non-transitory computer-readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer-readable signal medium may be any computer-readable medium that is not a computer-readable storage medium and that may communicate, propagate, or transport a program for use by or in connection with an instruction execution system, apparatus, or device. Program code embodied on a computer-readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C #, VB. NET, Python or the like, conventional procedural programming languages, such as the "C" programming language, Visual Basic, Fortran, Perl, COBOL, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, e.g., an installation on an existing server or mobile device.

Similarly, it should be appreciated that in the foregoing description of embodiments of the present disclosure, various features are sometimes grouped together in a single embodiment, figure, or description thereof to streamline the disclosure aiding in the understanding of one or more of the various inventive embodiments. This method of disclosure, however, is not to be interpreted as reflecting an intention that the claimed object matter requires more features than are expressly recited in each claim. Rather, inventive embodiments lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate" or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A system, comprising:

at least one storage device storing executable instructions for image reconstruction; and at least one processor in communication with the at least one storage device, wherein when executing the executable instructions, the at least one processor is configured to cause the system to perform operations including:

obtaining a projection image of a subject acquired by an imaging device, the projection image including a first region with a normal exposure corresponding to a first portion of the subject and a second region with an overexposure corresponding to a second portion of the subject;

using first pixel values of first pixels in the first region to correct second pixel values of second pixels in the second region, including: correcting, using the first pixel values of the first pixels in the first region, the second pixel values of the second pixels in the second region one by one, starting from a second pixel adjacent to the first region; and reconstructing, based on the first pixel values of the first pixels in the first region and the corrected second pixel values of the second pixels in the second region, a target image of the subject.

2. The system of claim 1, wherein the obtaining a projection image of a subject includes:

obtaining a raw projection image of the subject acquired by the imaging device;

segmenting the raw projection image according to a maximum pixel value among pixel values of pixels of the raw projection image; and determining the projection image based on the segmented raw projection image.

3. The system of claim 1, wherein the at least one processor is further configured to cause the system to perform operations including:

performing an air correction operation on the projection image.

4. The system of claim 1, wherein the correcting, using the first pixel values of the first pixels in the first region, at least one of the second pixel values of the second pixels in the second region one by one starting from a second pixel adjacent to the first region includes:

for a current second pixel to be corrected, determining a value reference pixel corresponding to the current second pixel, the value reference pixel being a first pixel in the first region or a corrected second pixel in the second region;

determining a gradient reference pixel in the first region corresponding to the current second pixel;

determining a local pixel gradient value of the gradient reference pixel; and determining, based on a reference pixel value of the value reference pixel and the local pixel gradient value of the gradient reference pixel, the corrected second pixel value of the current second pixel.

5. The system of claim 4, wherein the determining a value reference pixel corresponding to the current second pixel includes:

designating a corrected second pixel located in a same row as the current second pixel and adjacent to the current second pixel as the value reference pixel corresponding to the current second pixel.

6. The system of claim 4, wherein the determining a gradient reference pixel in the first region includes:

designating a first pixel in the first region that is located in a same row as the current second pixel and adjacent to the second region as a critical pixel; and determining a first pixel located in the same row as the current second pixel and symmetrical with the current second pixel with respect to the critical pixel as the gradient reference pixel.

7. The system of claim 4, wherein the determining a local pixel gradient value of the gradient reference pixel includes:

determining, based on the gradient reference pixel, two gradient estimation pixels; and determining, based on pixel values of the two gradient estimation pixels and a count of pixels spacing the two gradient estimation pixels, the local pixel gradient value of the gradient reference pixel.

8. The system of claim 7, wherein the determining, based on the gradient reference pixel, two gradient estimation pixels includes:

designating the gradient reference pixel as one of the two gradient estimation pixels; and designating a first pixel located in a same row as the gradient reference pixel and separated by a first count of pixels as another gradient estimation pixel.

9. The system of claim 7, wherein the determining, based on the gradient reference pixel, two gradient estimation pixels includes:

designating a first pixel located in a same row as the gradient reference pixel and separated by a second count of pixels as one of the two gradient estimation pixels; and designating a first pixel located in the same row as the gradient reference pixel and separated by a third count of pixels as another gradient estimation pixel, the gradient reference pixel being between the two gradient estimation pixels.

10. The system of claim 7, wherein the determining, based on pixel values of the two gradient estimation pixels and a count of pixels spacing the two gradient estimation pixels, the local pixel gradient value of the gradient reference pixel includes:

determining a difference between the pixel values of the two gradient estimation pixels; and determining the local pixel gradient value of the gradient reference pixel by dividing the difference by the count of pixels spacing the two gradient estimation pixels.

11. The system of claim 4, wherein the determining, based on a reference pixel value of the value reference pixel and the local pixel gradient value of the gradient reference pixel, the corrected second pixel value of the current second pixel includes:

determining a difference between the reference pixel value of the value reference pixel and the local pixel gradient value of the gradient reference pixel;

determining whether a correction termination condition is satisfied;

in response to determining that the correction termination condition is satisfied, determining the corrected second pixel value of the current second pixel by performing a post-processing operation on the difference corresponding to the current second pixel.

12. The system of claim 11, wherein the correction termination condition includes that the difference corresponding to the current second pixel is less than or equal to zero, the determining the corrected second pixel value of the current second pixel by performing a post-processing operation on the difference corresponding to the current second pixel includes:

adjusting the difference corresponding to the current second pixel to zero, and designating the adjusted difference as the corrected second pixel value of the current second pixel.

13. The system of claim 11, wherein the correction termination condition includes that a count of corrected second pixels reaches a threshold count and the difference corresponding to the current second pixel is greater than zero, or the current second pixel is the last pixel in the row where the current second pixel is located and the difference corresponding to the current second pixel is greater than zero, the determining the corrected second pixel value of the current second pixel by performing a post-processing operation on the difference corresponding to the current second pixel includes:

determining weights for the determined differences of the second pixels; and determining, based on the weights and the determined differences, the corrected second pixel values of the second pixels in the second region.

14. The system of claim 1, wherein the imaging device includes a cone beam computed tomography (CBCT) device.

15. A method for image reconstruction, implemented on a computing device having at least one processor and at least one storage device, the method comprising:

obtaining a projection image of a subject acquired by an imaging device, the projection image including a first region with a normal exposure corresponding to a first portion of the subject and a second region with an overexposure corresponding to a second portion of the subject;

using first pixel values of first pixels in the first region to correct second pixel values of second pixels in the second region, including: correcting, using the first pixel values of the first pixels in the first region, the second pixel values of the second pixels in the second region one by one starting from a second pixel adjacent to the first region; and reconstructing, based on the first pixel values of the first pixels in the first region and the corrected second pixel values of the second pixels in the second region, a target image of the subject.

16. The method of claim 15, wherein the correcting, using the first pixel values of the first pixels in the first region, at least one of the second pixel values of the second pixels in the second region one by one starting from a second pixel adjacent to the first region includes:

for a current second pixel to be corrected, determining a value reference pixel corresponding to the current second pixel, the value reference pixel being a first pixel in the first region or a corrected second pixel in the second region;

determining a gradient reference pixel in the first region corresponding to the current second pixel;

determining a local pixel gradient value of the gradient reference pixel; and determining, based on a reference pixel value of the value reference pixel and the local pixel gradient value of the gradient reference pixel, the corrected second pixel value of the current second pixel.

17. The method of claim 16, wherein the determining, based on a reference pixel value of the value reference pixel and the local pixel gradient value of the gradient reference pixel, the corrected second pixel value of the current second pixel includes:

determining a difference between the reference pixel value of the value reference pixel and the local pixel gradient value of the gradient reference pixel;

determining whether a correction termination condition is satisfied;

in response to determining that the correction termination condition is satisfied, determining the corrected second pixel value of the current second pixel by performing a post-processing operation on the difference corresponding to the current second pixel.

18. A non-transitory computer readable medium, comprising at least one set of instructions for image reconstruction, wherein when executed by at least one processor of a computing device, the at least one set of instructions direct the at least one processor to perform operations including:

obtaining a projection image of a subject acquired by an imaging device, the projection image including a first region with a normal exposure corresponding to a first portion of the subject and a second region with an overexposure corresponding to a second portion of the subject;

using first pixel values of first pixels in the first region to correct second pixel values of second pixels in the second region, including: correcting, using the first pixel values of the first pixels in the first region, the second pixel values of the second pixels in the second region one by one starting from a second pixel adjacent to the first region; and reconstructing, based on the first pixel values of the first pixels in the first region and the corrected second pixel values of the second pixels in the second region, a target image of the subject; wherein the correcting, using the first pixel values of the first pixels in the first region, at least one of the second pixel values of the second pixels in the second region one by one starting from a second pixel adjacent to the first region includes:

for a current second pixel to be corrected, determining a value reference pixel corresponding to the current second pixel, the value reference pixel being a first pixel in the first region or a corrected second pixel in the second region;

determining a gradient reference pixel in the first region corresponding to the current second pixel;

determining a local pixel gradient value of the gradient reference pixel; and determining, based on a reference pixel value of the value reference pixel and the local pixel gradient value of the gradient reference pixel, the corrected second pixel value of the current second pixel; wherein the determining a local pixel gradient value of the gradient reference pixel includes:

determining, based on the gradient reference pixel, two gradient estimation pixels; and determining, based on pixel values of the two gradient estimation pixels and a count of pixels spacing the two gradient estimation pixels, the local pixel gradient value of the gradient reference pixel, wherein the determining, based on the gradient reference pixel, two gradient estimation pixels includes:

designating a first pixel located in a same row as the gradient reference pixel and separated by a second count of pixels as one of the two gradient estimation pixels; and designating a first pixel located in the same row as the gradient reference pixel and separated by a third count of pixels as another gradient estimation pixel, the gradient reference pixel being between the two gradient estimation pixels.

19. The non-transitory computer readable medium of claim 18, wherein the determining, based on a reference pixel value of the value reference pixel and the local pixel gradient value of the gradient reference pixel, the corrected second pixel value of the current second pixel includes:

determining a difference between the reference pixel value of the value reference pixel and the local pixel gradient value of the gradient reference pixel;

determining whether a correction termination condition is satisfied;

in response to determining that the correction termination condition is satisfied, determining the corrected second pixel value of the current second pixel by performing a post-processing operation on the difference corresponding to the current second pixel.

20. The non-transitory computer readable medium of claim 19, wherein the correction termination condition includes that a count of corrected second pixels reaches a threshold count and the difference corresponding to the current second pixel is greater than zero, or the current second pixel is the last pixel in the row where the current second pixel is located and the difference corresponding to the current second pixel is greater than zero, the determining the corrected second pixel value of the current second pixel by performing a post-processing operation on the difference corresponding to the current second pixel includes:

determining weights for the determined differences of the second pixels; and determining, based on the weights and the determined differences, the corrected second pixel values of the second pixels in the second region.

* * * * *